(12) United States Patent
Albert et al.

(10) Patent No.: US 7,048,163 B2
(45) Date of Patent: May 23, 2006

(54) RECEIVING CASE FOR AN AUDIO-VIDEO UNIT COMPRISING AN ELECTRONIC CONSOLE, SUCH AS VIDEO READER OR PLAY STATION, AND THE ASSOCIATED INDEPENDENT SCREEN

(75) Inventors: Pascal Albert, Bettange (LU); Liu Mei Chi, Bettange sur Mess (LU)

(73) Assignee: Servic System AG, Neuwied (DE)

( * ) Notice: Subject to any disclaimer, the term of this patent is extended or adjusted under 35 U.S.C. 154(b) by 48 days.

(21) Appl. No.: 10/376,284

(22) Filed: Mar. 3, 2003

(65) Prior Publication Data

US 2004/0144817 A1     Jul. 29, 2004

(30) Foreign Application Priority Data

Jan. 28, 2003  (FR)  ................................. 03 00937

(51) Int. Cl.
*B60R 7/00* (2006.01)

(52) U.S. Cl. ..................................... 224/275
(58) Field of Classification Search ................ 224/275; 383/630, 4

See application file for complete search history.

(56) References Cited

U.S. PATENT DOCUMENTS

| | | | | |
|---|---|---|---|---|
| 4,563,777 A | * | 1/1986 | Park ............................... | 2/108 |
| 4,635,110 A | * | 1/1987 | Weinblatt .................... | 348/837 |
| 5,226,576 A | * | 7/1993 | Ellsworth .................... | 224/572 |
| 5,573,166 A | * | 11/1996 | Leja .............................. | 224/630 |
| D419,520 S | * | 1/2000 | Bergh .......................... | D12/416 |
| D425,474 S | * | 5/2000 | Bergh .......................... | D12/416 |
| 6,092,705 A | * | 7/2000 | Meritt .......................... | 224/275 |
| 6,123,239 A | * | 9/2000 | Lovitt .......................... | 224/413 |
| 6,145,661 A | | 11/2000 | Jung | |
| D446,008 S | * | 8/2001 | Schulze ....................... | D3/216 |
| 6,283,299 B1 | | 9/2001 | Lee | |
| D451,882 S | * | 12/2001 | Hassett et al. ............. | D12/416 |
| 6,405,909 B1 | * | 6/2002 | Burnett et al. .............. | 224/275 |
| 6,473,315 B1 | * | 10/2002 | Denmeade .................. | 361/831 |
| 6,513,686 B1 | * | 2/2003 | Ben-Sasson ................ | 224/275 |
| D479,186 S | * | 9/2003 | Hassett ....................... | D12/416 |
| 2003/0226148 A1 | * | 12/2003 | Ferguson ..................... | 725/75 |

FOREIGN PATENT DOCUMENTS

| | | |
|---|---|---|
| DE | G 85 25 901.2 U1 | 1/1987 |
| DE | G 92 12 801.7 U1 | 5/1993 |
| DE | 295 18 369 U1 | 1/1996 |
| GB | 2 312 160 A | 10/1997 |

\* cited by examiner

*Primary Examiner*—Tri M. Mai
(74) *Attorney, Agent, or Firm*—Young & Thompson

(57) ABSTRACT

A receiving case for a video unit includes an electronic console (2) and an associated independent screen (3), which case includes stowing sections (4,5) suited to accommodate respectively the electronic console (2) and the associated screen (3), and also includes an element to hold the external face of the stowing section (5) suited to accommodate the screen (3) tight against the rear face of the headrest section of a seat. These holding device consists of a fastening system, for instance in the form of single block head-rest protective cover (20).

11 Claims, 5 Drawing Sheets

RECEIVING CASE FOR AN AUDIO-VIDEO UNIT COMPRISING AN ELECTRONIC CONSOLE, SUCH AS VIDEO READER OR PLAY STATION, AND THE ASSOCIATED INDEPENDENT SCREEN

BACKGROUND OF THE INVENTION

This invention concerns a container in the form of an attaché case or a bag intended to accommodate a video set composed of an electronic console, such as a DVD, SVCD, VCD-reader, a play station or other, and of the associated independent screen, such as a liquid crystal display, a cathodic, a plasma screen or other, which container may be attached to the rear face of a seat; the invention also concerns the complete video unit composed of such attaché case or bag fitted with the electronic console and the associated screen.

DESCRIPTION OF THE RELATED ART

The attaché case or bag structures Intended for the accommodation of video sets are traditionally composed of two stowing sections, fitted with means which enable removable locking of said structure in closed position; one of said stowing sections is adapted to accommodate the video screen, with its front face visible when the attaché-case is in open position, and the other of said stowing sections is adapted to accommodate the associated electronic console. This attaché case comprises moreover—means for connecting said electronic console and said screen to an electric power supply, as well as—means for audio-video connection between said console and said screen.

This portable structure, associated with a seat, comprises its video screen at the rear face of the back section. This position provides limited viewing angle, which has led to develop added structures comprising a receptacle for the screen and intended for positioning said screen on the rear face of the head-rest section.

These structures oblige the user to handle the screen in order to extract it from the case or bag structure; an external cable set must also be placed to supply the screen and to ensure the audio-video link between said screen in external position and the electronic console remaining the case or bag structure.

SUMMARY OF THE INVENTION

The purpose of this invention is to remedy these shortcomings while providing an original receiving structure in the form of an attaché case or bag to be attached directly to the head-rest section of the seat, to obtain optimal viewing angle without requiring an added receiving structure.

According to this invention, this receiving case for a video unit is characterised in that it comprises a fastening system which enables to hold the external face of the section suited to accommodate the video screen tight against the rear face of the head-rest section of the seat.

By 'fastening system' is meant notably any means enabling removable interconnection of the receiving case on the rear face of the head-rest section of the seat; this fastening system can form a single block with the case, but it may also consist of a fastening system added on to said case.

According to a possible embodiment, the case comprises a strapping system which may be applied around the head-rest section of the seat, notably horizontally or vertically.

According to an alternative, the receiving case is fitted with holding means consisting of a structure of self-gripping bands provided partially on the external face of the section suited to accommodate the screen and partially on the rear face of the head-rest section of the seat.

According still to a possible embodiment, the holding means of the case on the head-rest section of the seat consists of a protective cover intended for the head-rest section of the seat.

Still according to the invention, the case is composed of two independent stowing sections interconnected by means of a hinged system, which stowing sections are each associated with means enabling their removable locking in closed position, i.e. when they are in contact with one another by their peripheral rim.

According to this embodiment, the case comprises a first stowing section suited to accommodate the screen, which is interconnected with a second section suited to accommodate the electronic console by a removable linking means which enables disconnection of both these sections.

According to another possible embodiment, the case comprises two juxtaposed stowing sections, forming a single stowing space intended to contain the electronic console and the adjoining associated screen.

Still according to the invention, the case comprises—at least a power supply socket from which extends an internal power supply cabling intended for connection to said screen and said console, and—an internal cabling system for the audio-video link between said console and said screen.

According to a particular embodiment, the case comprises at least a stowing section suited to accommodate the screen and/or the electronic console fitted with means for removable holding on said screen and/or said console.

The invention also concerns the video unit composed of a case as defined above, in one of the stowing sections whereof the screen is positioned, and in the other stowing section whereof the electronic console is inserted, which case also integrates—at least one power supply cable for linking the power supply socket, notably to the mains or the cigarette lighter socket of an automotive vehicle or other, as well as possibly—various accessories such as a remote control or a audio headset for example.

BRIEF DESCRIPTION OF THE DRAWINGS

But the invention will be better illustrated, without being limited thereto, by the following description of particular embodiments, given solely for exemplification purposes and represented on the appended drawings wherein.

DESCRIPTION OF THE PREFERRED EMBODIMENTS

Figure 1:
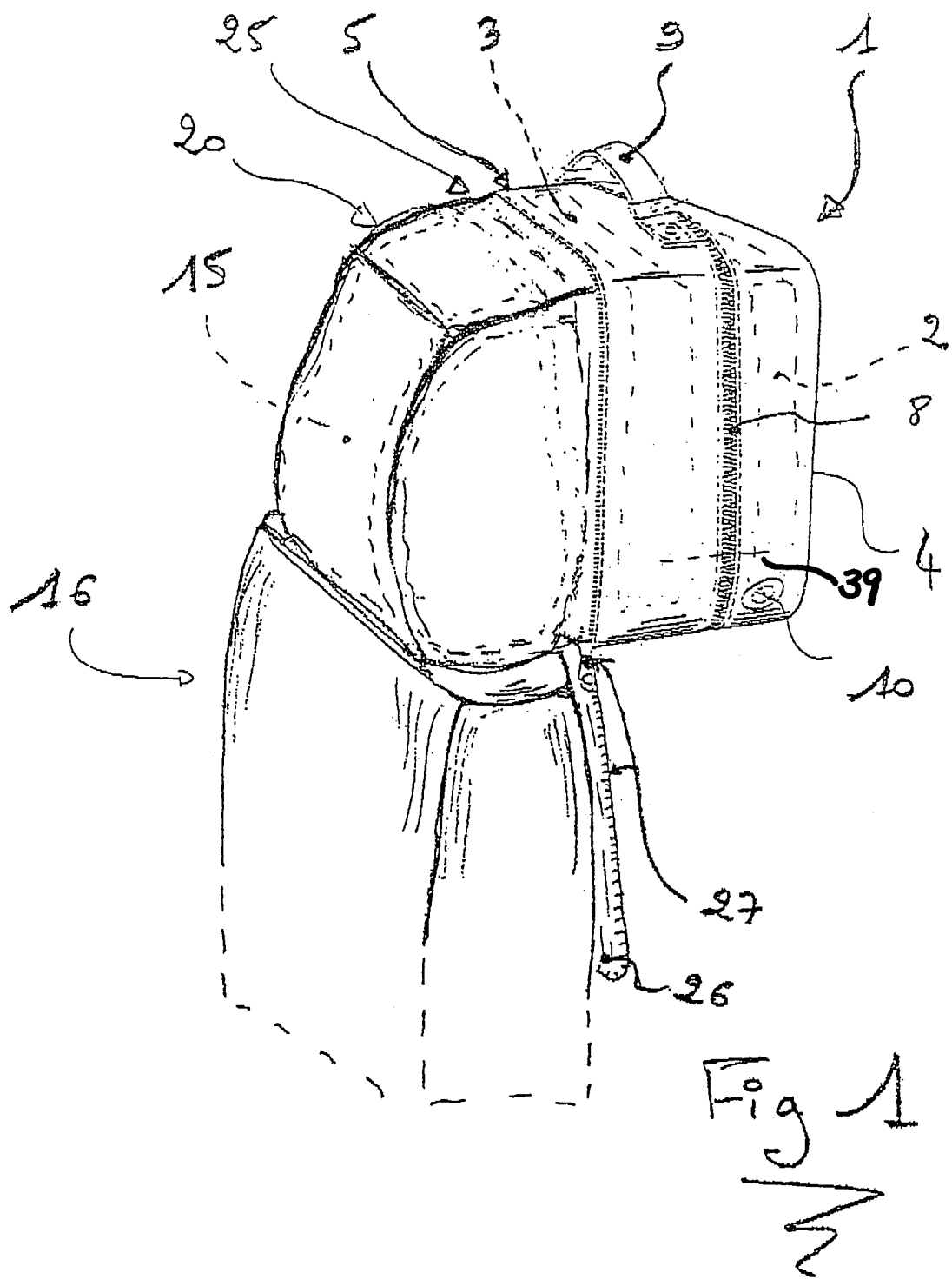
FIG. 1 is a perspective view of an attaché case or bag according to this invention, comprising a fastening system such as protective cover for the head-rest section of the seat, illustrated here in closed position.

The case or bag illustrated on FIGS. 1 to 5 enables to stow—an electronic console 2 which is here in the form of a DVD reader and—an associated screen 3, it also integrates internal pre-cabling intended to link the reader 2 and the screen 3 for viewing video DVDs.

This attaché case or bag 1 comprises two independent stowing sections 4 and 5 in the overall shape of a parallelepiped, linked by a hinged system 6 at the bottom area. This hinged system 6, in a particular embodiment, comprises a zip fastener 7 enabling removable locking and thereby disconnection of both stowing sections 4 and 5, FIG. 2.

These stowing sections 4, 5 are, besides, provided with a zip fastener 8 extending on the other three sides of their peripheral rim, i.e. on the lateral sides and on the front face.

The zip fastener 8 enables removable locking of both stowing sections 4 and 5 in closed position, i.e. when said stowing sections 4 and 5 are in contact with one another by their peripheral rim.

The external envelope of both stowing sections 4 and 5 can be made of flexible material, such as fabric, plastic or leather for example It can also be noted that the attaché case 1 is fitted with a grip handle 9 provided on the front section, i.e. on the side opposite the hinge 6. In the illustrated embodiment, the handle 9 is attached to the stowing section 5 suited to accommodate the screen 3.

The internal face of the stowing section 4 is suited to accommodate the console 2 in the form of a DVD reader; the internal face of the other stowing section 5 is suited to accommodate the screen 3.

Figure 2:
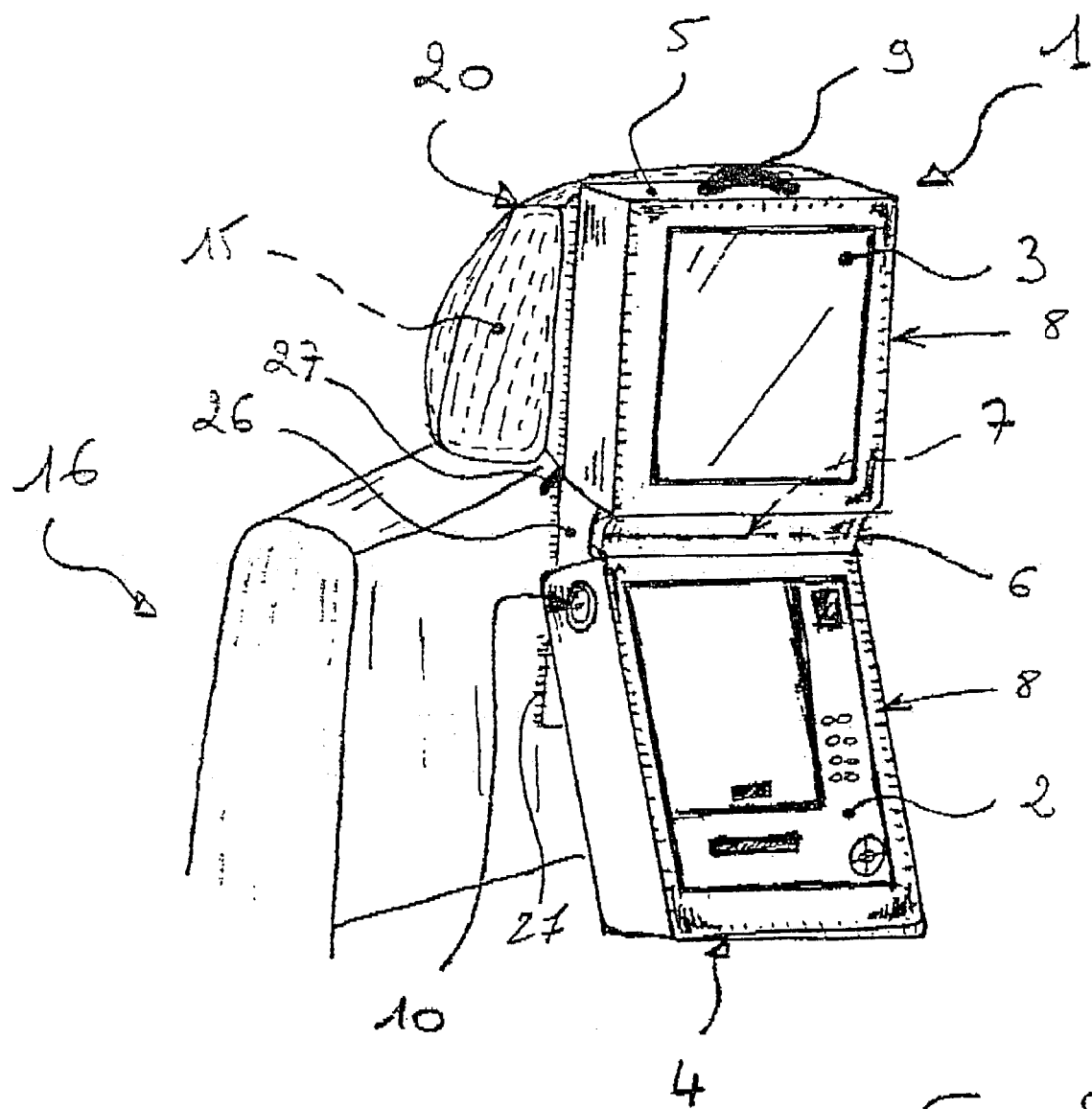
FIG. 2 is a perspective view of the case represented on FIG. 1, illustrated from another angle and in open position.

To this end, these stowing sections 4, 5 integrate known means to maintain the console 2 and the screen 3 in the desired position, so that the front face of both these electronic devices 2, 3 is visible when the attaché case is in open position, FIG. 2.

For exemplification purposes, the electronic devices 2, 3 may comprise additional latching members for removable locking of said devices 2, 3 within suited stowing sections.

The electric cables 39 enabling to operate the video unit 2, 3 are integrated within the structure of the case 1.

On FIGS. 1 and 2, one can note the presence of a power supply socket 10 fastened to the external envelope of the attaché case, and in particular for the illustrated embodiment, fastened to the stowing section 4. This power supply socket 10 enables to connect the unit to the mains or to the cigarette-lighter of an automotive vehicle, by means of an appropriate connection cable fitted with a suitable removable jack.

The integrated cables which supply respectively the DVD reader and its associated screen extend from the connection socket 10.

The reader 2 and the screen 3 are moreover connected by different cables intended to provide an audio-video link.

This attaché case also comprises means to hold the external face of its stowing section 5 suited to accommodate the screen 3 tight against the rear face of the head-rest section 15 of a seat 16, in particular an automotive seat.

According to the embodiment represented on FIGS. 1 and 2, this holding means consists of a protective cover-type fastening system 20 intended to cover the head-rest section 15 of the seat 16.

This structure in the shape of a head-rest cover 20 is provided as a single block on the external face of the stowing section 5.

It may be stowed in an additional pocket 25 for example in the form of a bellows pocket, provided on the external surface of the stowing sections 5 and blanked off by a closing flap 26. This pocket 25 can be deployed by means of a zip fastener 27, enabling to separate said flap 26 from the external face of the stowing section 5. This zip fastener 27 may extend on three sides of said flap 26.

For exemplification purposes only, the flap 26 consists of a flexible material without any rigid frame, enabling to fold it up within the cover 20 when said cover is in position of the head-rest.

The case according to the invention in open position, FIG. 2, once attached to the head-rest 15, provides a wide viewing field of the screen 3, with requiring dissociation between said screen 3 and said stowing section 5, let alone any separation between both stowing sections 4, 5.

Figure 3:
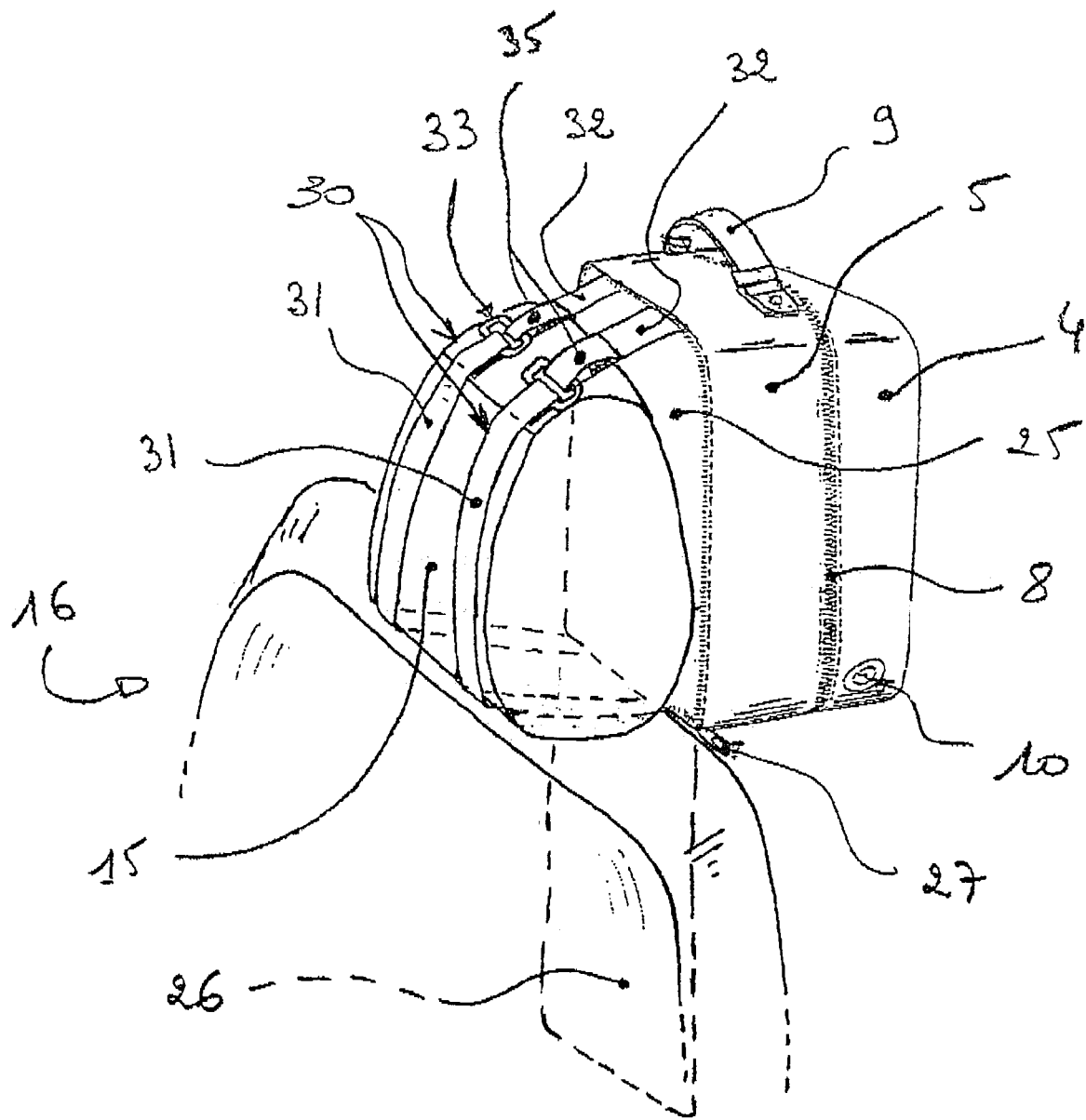
FIG. 3 is a perspective view of a case according to this invention, comprising a strapping-type fastening system.

FIG. 3 represents another possible embodiment of a case according to the invention, whereof the fastening system consists of the vertical strap type.

In this embodiment, the case is fitted, on the external face of the stowing section 5, with two strap systems 30, hugging vertically the head-rest section 15 of the seat 16. Each strap system 30 is composed of two strap sections 31, 32; one of said strap sections 31 is fitted at its free end with a buckle 33 and the other of said strap sections 32 is fitted at its free end with a self-gripping band 35 enabling to interconnect said strap section 32 to said buckle 33.

This strap fastening system enables to suit the case to various head-rest gauges by adjusting the hugging tension, by means notably of the self-gripping band 35 provided on the strap section 32.

As described in the previous embodiment, these strap systems 30 may be stowed in an additional pocket 25 provided on the external face of the stowing section 5 of the case.

Still according to another possible embodiment, the case comprises a fastening system consisting of a self-gripping band structure provided partially on the external of the case and partially on the rear face of the head-rest section of the seat.

Figure 4:
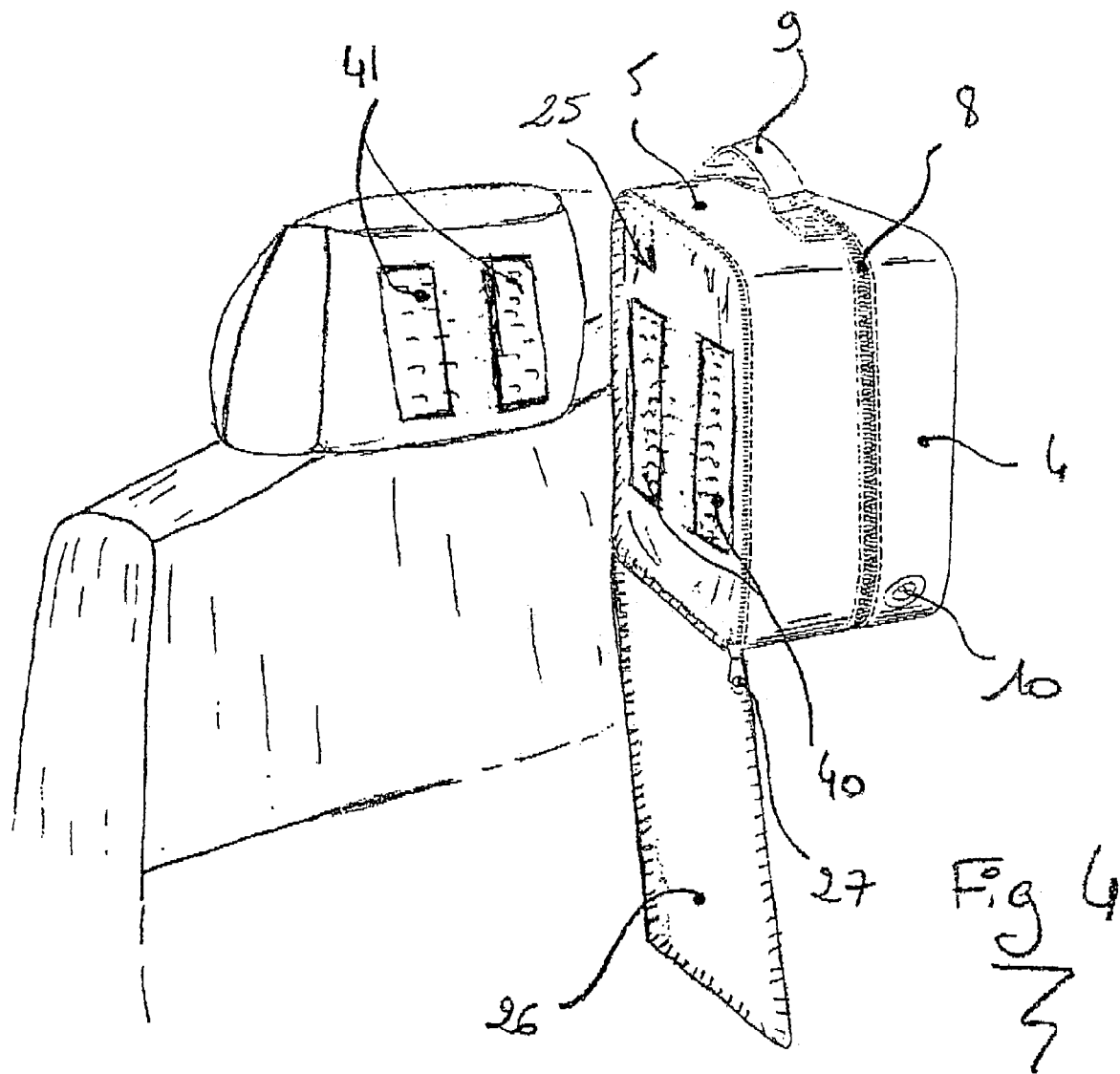
FIG. 4 is a schematic representation of a case comprising a fastening system of the self-gripping band type, intended to co-operate with an additional system of the self-gripping band type provided on the rear face of the head-rest section of the seat.

This embodiment, represented on FIG. 4, consists of a self-gripping band structure 40 provided on the external face of the stowing section 5; this band structure 40 may also be arranged within the additional pocket 25 aforementioned, but it may also be arranged directly on the external face of the stowing section 5, in the absence of this additional pocket 25.

The additional structure of the self-gripping band 41 is provided in the external face of the head-rest section 15 of a seat 16. It may also be directly integral with the protective cover of said head-rest 15, for example by gluing, sewing or other, or still be provided on the head-rest section 15 by means of a removable head-rest cover.

Figure 5:
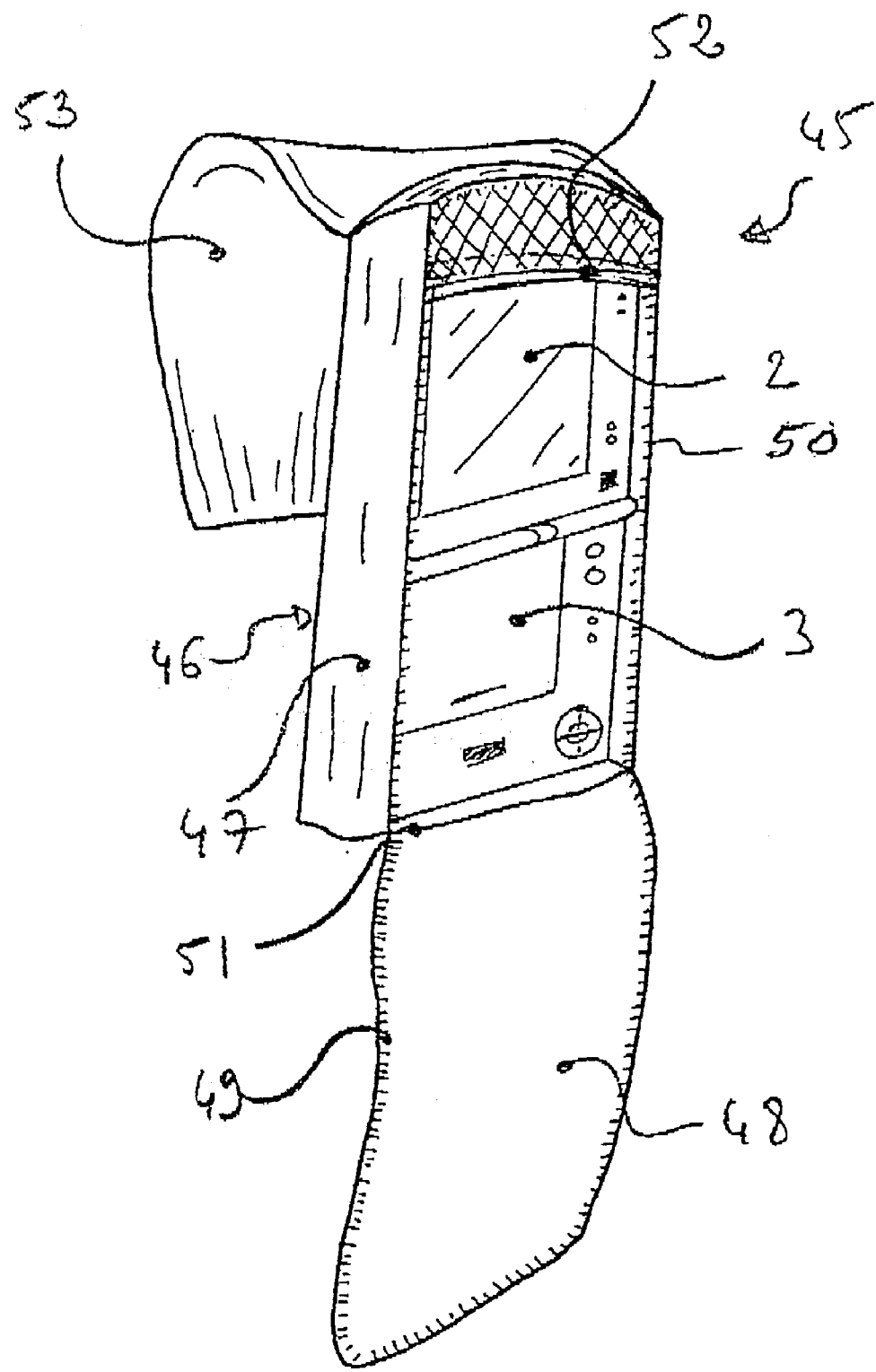
FIG. 5 is a perspective view of a different case structure fitted with a cover to be attached to the head-rest section of the seat.

FIG. 5 represents also an alternate shape of an attaché case according to the invention, comprising two juxtaposed stowing sections, delineating a single stowing space, and suited to accommodate a video unit whereof the screen 2 and the console 3 are adjoining. This video unit 2, 3 exhibits here the shape of a single block assembly, whereby the console 2 and the screen 3 are linked by an integral hinged system.

This attaché case 45 is delineated by a bottom 46 and a belt of lateral walls 47. It is made of flexible material, for example fabric or synthetic material. The lateral walls 47 may be reinforced by the implementation of a rigid belt against the internal face of said walls.

It comprises moreover a flap 48 enabling to close the case 45, and thereby prevent access to the video unit. This flap 48 is fitted on three of its sides of a zip fastener 49, additional to a system 50 provided on the three upper rims opposite the lateral walls 47; the last side 51 deprived of a zip fastener forms a hinged system between the lid 48 and the free rim of one of the lateral walls 47

The video unit 2, 3 is held in the case 45 by any suited means. To this end, the internal face of the bottom 46 may be fitted with a self-gripping band system, intended to co-operate with an additional band provided on the rear face of the console 2; the case 45 may also comprise an elastic band 52 intended to hug the upper end of the screen 3. It is then possible to integrate or to remove rapidly the video unit 2, 3 from the case 45.

According to the invention, the case 45 is fitted with a fastening system enabling to hold the external face of the bottom 46 tight against the rear face of the head-rest of the seat. This fastening system consists here of a structure 53 in the form of a head-rest protective cover, which cover 53 is integral with the external face of the bottom 46 by any appropriate means, and notably by sewing or gluing.

The cases described above enable to accommodate an electronic console and its associated screen; the video unit obtained can be implemented in any location fitted with an appropriate electric power supply source.

It will be noted that the fastening system of the cases according to this invention may also be implemented on the upper section of a single block seat back against which the users head can lean.

What is claimed is:

1. A receiving case (1), comprising:
   a storage part for storing a video unit with an electronic console (2) and an associated independent screen (3);
   a fastening system to attach the storage part to a seat headrest,
   the storage part comprising i) a first stowing section (5) adapted to accommodate the screen (3), and, with the first stowing section in an open position, have a front face of the screen be visible to a viewer, and ii) a second stowing section (4) adapted to accommodate the electronic console (2),
   the fastening system (20) comprising i) a headrest cover (20) adapted to cover the seat headrest, the cover located on an external face of said first stowing section, ii) a pocket (25) adapted and sized to stow said cover, and iii) a closing flap (26) that closes off said pocket when said cover is stowed in said additional pocket;
   a hinged system (6) interconnected the first stowing section and the second stowing section;
   a zip fastener (8) extending on three lateral sides and on the front face of the first and second stowing sections, the zip fastener removably locking both of the frist and second stowing sections in a closed position so that said first and second stowing sections are in contact with one another by their peripheral rim; and
   a removable linking means (7) which enables disconnection of the first and second stowing sections.

2. A receiving case (1), comprising:
   a storage part for storing a video unit with an electronic console (2) and an associated independent screen (3);
   a fastening system to attach the storage part to a seat headrest,
   the storage part comprising i) a first stowing section (5) adapted to accommodate the screen (3), and, with the first stowing section in an open position, have a front face of the screen be visible to a viewer, and ii) a second stowing section (4) adapted to accommodate the electronic console (2),
   the fastening system (20) comprising i) a headrest cover (20) adapted to cover the seat headrest, the cover located on an external face of said first stowing section, ii) a pocket (25) adapted and sized to stow said cover, and iii) a closing flap (26) that closes off said pocket when said cover is stowed in said additional pocket;
   a power supply socket (10) fastened to an external envelope of the storage part sized to allow passage of a power cord; and
   an internal cabling system for an audio-video link between said console and said screen.

3. A receiving case (1), comprising:
   a storage part for storing a video unit with an electronic console (2) and an associated independent screen (3);
   a fastening system to attach the storage part to a seat headrest,
   the storage part comprising i) a first stowing section (5) adapted to accommodate the screen (3), and, with the first stowing section in an open position, have a front face of the screen be visible to a viewer, and ii) a second stowing section (4) adapted to accommodate the electronic console (2),
   the fastening system (20) comprising a headrest cover (20) adapted to cover the seat headrest, the cover located on an external face of said first stowing section, ii) a pocket (25) adapted and sized to stow said cover, and iii) a closing flap (26) that closes off said pocket when said cover is stowed in said additional pocket; and
   in the stowing sections whereof are positioned the screen (3) and the electronic console (2), whereas said case also integrates at least one power supply cable for connecting a power supply socket to the mains or to the cigarette-lighter socket of an automotive vehicle.

4. The receiving case of claim 3, wherein the second stowing part is sized and shaped to stow a DVD reader and the first stowing part is sized and shaped to stow a DVD reader screen hinged to the DVD reader.

5. A receiving case, comprising:
   a storage portion with a first stowing compartment (5) shaped to stow an electronic console (2) and a second stowing compartment (4) shaped to stow a screen separately housed from the console,
   the storage portion, when closed having an overall parallelepiped shape,
   the storage portion, when open, exposes a viewing surface of the screen to a viewer;
   a hinge joining the first and second stowing compartments;
   a headrest cover (20) configured to tightly hold an external face of the storage portion to a rear face of a car seat headrest while the first stowing compartment stows the electronic console, the headrest cover having a headrest shape and sized to cover the car headrest, the headrest cover attached to the external face of the first stowing compartment; and
   a pocket (25), on the external face of the first stowing compartment, sized to stow the headrest cover,
   the pocket comprising a closing flap (26) adjacent closing off when said headrest cover is stowed in said pocket;
   a grip handle (9); and
   a power supply socket (10) fastened to the storage section and providing an opening through the storage section for a power cord.

6. The case of claim 5, further comprising a first zip fastener (27) attached to the closing flap, the first zip fastener enabling separation of said flap from the external face of the first stowing compartment.

7. The case of claim 6, wherein, the first zip fastener extends on three sides of said flap.

8. The case of claim 5, wherein the pocket is a bellows pocket.

9. The case of claim 5, wherein the flap comprises a flexible material free of any rigid frame and foldable within the headrest cover when said headrest cover is covering the car headrest.

10. The case of claim 5, wherein, the hinge comprises a second zip fastener (7), attached to a first of four edges of the first and second stowing compartments, the second zip fastener enabling separation of the first and second stowing compartment to have the first stowing compartment being completely free of the second stowing compartment.

11. The case of claim 10, further comprising:
a third zip fastener (8) attached to the second through fourth edges of the first and second stowing compartments, the third zip fastener allowing a user to change the case from a closed configuration to an open configuration.

* * * * *